Aug. 19, 1952 — P. H. BISCOE — 2,607,227
LIQUID LEVEL GAUGE
Filed July 17, 1947
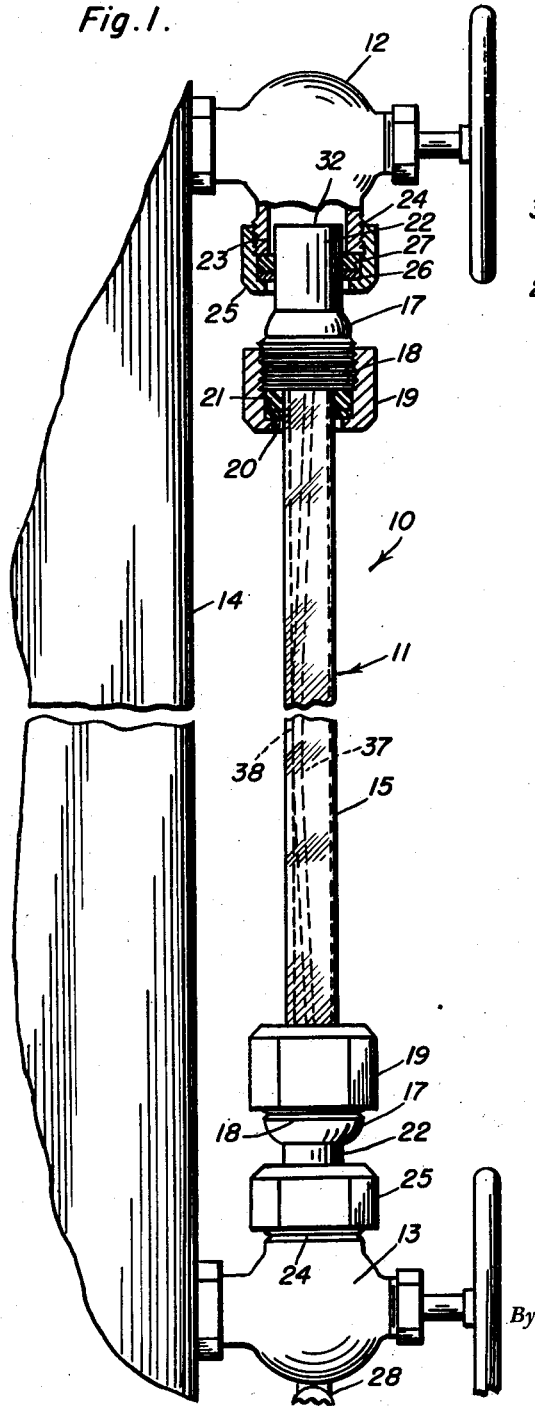
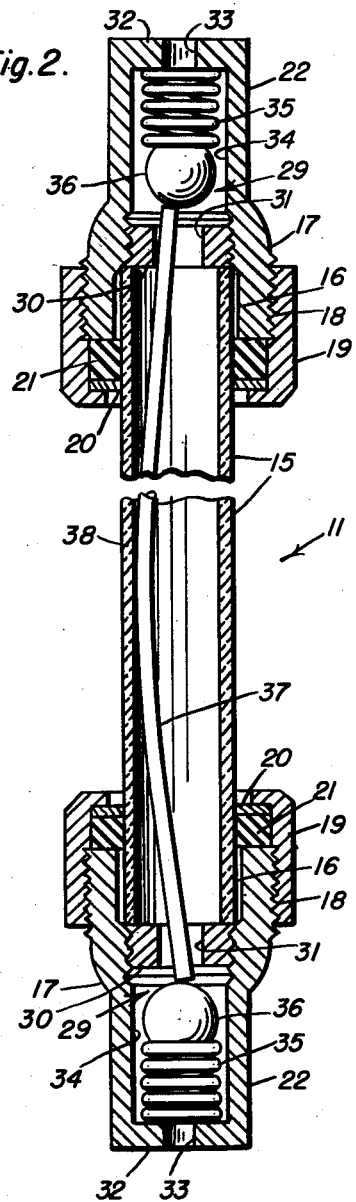
Inventor
Percival H. Biscoe Patented Aug. 19, 1952

2,607,227

UNITED STATES PATENT OFFICE 2,607,227

LIQUID LEVEL GAUGE

Percival H. Biscoe, Jacksonville, Fla., assignor to Saf-T-Visi Gauge Corporation, a corporation of Florida Application July 17, 1947, Serial No. 761,487

2 Claims. (Cl. 73—333)

The present invention relates to improvements in liquid level gauges of the safety sight tube type.

Conventional liquid level gauges usually assume the form of a glass tube mounted between two manually operable cocks which, in turn, are installed on the wall of the boiler, the arrangement being that when the two cocks are open, the level of liquid in the sight tube corresponds to the level of liquid in the boiler.

Notwithstanding their reliability and accuracy, gauges of this type present considerable disadvantage which results from accidental breakage of the fragile sight tube. In such event, the contents of the boiler are forcibly blown out through the broken tube, unless immediate steps are taken to close the two cocks of the gauge. This however, is not always a simple task, particularly if the boiler contains ammonia, hot water and steam, or the like, in which instances not only is the boiler pressure substantially reduced and considerable amount of material lost, but also, the attendant frequently sustains extensive injuries by coming in contact with the hot material while attempting to close the cocks.

One object of the present invention is to provide a new and improved safety liquid level gauge by which some of the shortcomings of the prior art are avoided.

With the above important object in view, and such other objects as may become apparent as this specification proceeds, the invention consists essentially of the arrangement and construction of parts as illustrated in the accompanying drawings, in which:

Figure 1 is an elevational view of the invention partially broken away and showing the same in situ on a boiler; and Figure 2 is a longitudinal cross-sectional view of the sight tube assembly per se, illustrated in Figure 1.

Like characters of reference are used to designate like parts in the specification and throughout the several views.

Referring now to the accompanying drawings in detail, the invention consists of a liquid level gauge designated generally by the reference character 10, the same embodying in its construction a frangible sight tube assembly 11, replaceably mounted between a pair of spaced cocks 12, 13 provided on a boiler, or the like, 14.

The assembly 11 consists of a sight tube 15 formed from glass or other frangible material, the end portions of which are receivable in suitable bores 16 provided in a pair of substantially cylindrical coupling blocks 17. These blocks, in turn, are provided with externally threaded portions 18 adapted to receive compression nuts 19 of conventional type, suitable washers and gaskets 20, 21 respectively being provided in the nuts, whereby the blocks 17 are rigidly secured to the tube 15, as will be clearly apparent.

The free end portions of the blocks 17 constitute what may be referred to as adaptors 22, these being slidably and removably receivable in the "sockets" 23 provided in the aforementioned cocks 12, 13. The sockets 23 are externally screw-threaded as at 24, and further compression nuts, washers and gaskets 25, 26 and 27 respectively are employed for removably securing the adaptors 22 in the sockets, the nuts 25 engaging the threaded portions 24, as is best shown in Figure 1.

For cleaning purposes, the cock 13 may be equipped with a suitable drain tap 28.

Two valve units 29 are provided at the ends of the tube 15, these units being similar in construction, so that a description of one will suffice for both.

Each of the valve units 29 consists of a screw-threaded disk 30 secured in the bore 16 adjacent the end of the tube 15 and provided with a central passage or opening 31, the purpose of which will be hereinafter described. The adaptor 22 terminates in an end wall 32 formed with an additional aperture or passage 33, and the interior of the block defines what may be referred to as a chamber 34. This chamber accommodates a compression spring 35, one end of which bears against the end wall 32, while its remaining end engages a spherical valve member 36. The spring 35 normally urges the member 36 against the disk 30 and the latter, together with the opening 31, functions as a seat for the member 36. That is to say, the member 36 normally engages the seat, thus closing the passage 31.

Means are provided for retaining the two valve units 29 in an open position, said means consisting of a collapsible or bendable rod 37 which is disposed longitudinally in the tube 15.

The end portions of this rod extend through the openings 31 in the disks 30 and engage the valve members 36, as illustrated in Figure 2. It should be understood that the rod 37 is of sufficient length as to retain the valve units 29 in the open position against the resiliency of the springs 35, but it should be noted that the springs, acting through the medium of the members 36, produce a slight arcuation of the rod, so that the mid-portion of the latter is supportably engaged by the inner surface 38 of the tube 15.

It will be apparent from the foregoing that as long as the sight tube 15 remains intact, the rod 37 will retain the valve units 29 in an open position and liquid and gas in the boiler 14 will be permitted to enter the sight tube through the openings 33, 31, so that the level of liquid in the boiler may be easily and accurately determined by simply observing the corresponding level of liquid in the sight tube.

However, if the sight tube 15 is accidentally broken, the resiliency of the springs 35 will cause the rod 37 to bend or buckle outwardly through the broken tube, and as a result, the valve units 29 will automatically and instantly close, thereby preventing the escape of material from the boiler, even while the cocks 12, 13 remain open.

Attention is particularly directed to the fact that the tube 15 coacts with the rod 37 in retaining the valve units in the open position, inasmuch as the tube prevents the rod from excessive bending, buckling or collapsing.

After breakage of the tube 15, the entire assembly 11 may be easily and conveniently replaced by simply closing the cocks 12, 13, unscrewing the nuts 25 and withdrawing the adaptors 22 from the sockets 23.

While in the foregoing there has been shown and described the preferred embodiment of this invention it is to be understood that minor changes in the details of construction, combination and arrangement of parts may be resorted to without departing from the spirit and scope of the invention as claimed.

Having described the invention what is claimed as new is:

1. A liquid level gauge comprising in combination, a frangible sight tube including an inner surface, a coupling block mounted at each end of said tube, a valve in each of said blocks, springs normally urging said valves in a closed position, and a flexible bendable rod disposed longitudinally in said tube, the ends of said rod engaging said valves and retaining the same in an open position against the resiliency of said springs, and said springs acting through the medium of said valves and urging the mid-portion of said rod in supportable engagement with the inner surface of said tube.

2. A liquid level gauge comprising in combination, a frangible sight tube presenting an inner surface, a coupling block mounted at one end of said tube, means closing the other end of said tube, a valve in said block, a spring normally urging said valve in a closed position, and a flexible bendable rod disposed longitudinally in said tube, the ends of said rod engaging said valve and said closing means respectively and retaining said valve in open position against the resiliency of said spring, said spring acting through the medium of said valve urging the mid-portion of said rod in supportable engagement with the inner surface of said tube.

PERCIVAL H. BISCOE.

REFERENCES CITED

The following references are of record in the file of this patent:

UNITED STATES PATENTS

| Number | Name | Date |
| --- | --- | --- |
| 345,156 | Little | July 6, 1886 |
| 363,071 | Little | May 17, 1887 |
| 952,833 | Moore | Mar. 22, 1910 |
| 1,224,752 | Kirkwood | May 1, 1917 |
| 1,253,727 | Robinson | Jan. 15, 1918 |
| 1,361,303 | Breakey | Dec. 7, 1920 |

FOREIGN PATENTS

| Number | Country | Date |
| --- | --- | --- |
| 12,715 | Great Britain | June 30, 1894 |
| 17,934 | Great Britain | Dec. 30, 1887 |